United States Patent [19]

Kaminski et al.

[11] Patent Number: 4,861,541
[45] Date of Patent: Aug. 29, 1989

[54] METHOD FOR APPLYING LABELS TO BLOW MOLDED ARTICLES

[75] Inventors: Ronald S. Kaminski, Bowling Green; Robert P. Snyder, Sylvania; Michael J. Crowley, Pleasant Plain, all of Ohio

[73] Assignee: Owens-Illinois Plastic Products Inc., Toledo, Ohio

[21] Appl. No.: 54,928

[22] Filed: May 28, 1987

[51] Int. Cl.⁴ .............................................. B29C 49/24
[52] U.S. Cl. .................................... 264/509; 156/566; 264/511; 264/516; 425/504; 425/126.1
[58] Field of Search ........................ 264/509, 511, 516; 425/504, 503, 126 R, 126.1; 156/566; 53/137, 415; 83/294, 414; 198/428

[56] References Cited

U.S. PATENT DOCUMENTS 3,915,785 10/1975 Miller ................................... 156/355
4,636,166 1/1987 Franks et al. ........................ 425/503
4,787,833 11/1988 Krall ................................... 425/126.1

*Primary Examiner*—Jan H. Silbaugh
*Assistant Examiner*—Neil M. McCarthy

[57] ABSTRACT

In the method of making a hollow plastic articles wherein a label is positioned in each of a plurality of spaced partible molds in a predetermined array, a preform is positioned in each set of partible molds and the molds are closed and the preform is blown outwardly to the confines of the mold to apply the label to the resultant hollow plastic article, the method and apparatus which comprises providing labels on a roll of labels, successively engaging the free end of the web of the roll of labels by a first endless vacuum conveyor, tensioning the portion of the web between a point upstream and the free end by the first endless vacuum conveyor, successively cutting a label on the free end from the remaining tensioned portion, transferring each label successively by moving the first endless conveyor adjacent a second endless vacuum conveyor which is transverse to the the first conveyor, indexing the second endless conveyor to provide an array of labels on the second endless conveyor which corresponds in spacing to the spacing of the array of molds, engaging the array of labels and moving them from a first position adjacent said second conveyor to a second position within the partible molds and depositing the labels in the molds.

7 Claims, 11 Drawing Sheets

METHOD FOR APPLYING LABELS TO BLOW MOLDED ARTICLES

This invention relates to the application of labels to hollow blown plastic articles.

BACKGROUND AND SUMMARY OF THE INVENTION

In the making of hollow blown plastic articles such as containers, it has heretofore been suggested that labels be held in one or more of the mold sections by vacuum so that when the parison is blown outwardly into conformity with the cavity, the label becomes adhered or bonded to the article.

The molds are often provided in a plurality of sets of partible molds in a predetermined array and, in order to delivery the labels, a plurality of magazines are provided, one for each mold half, and an associated plurality of pick-up and delivery devices function to remove labels from the magazines and deliver them to one or both of the mold halves of each set.

As set forth in copending U.S. patent application Ser. No. 707,335 filed Mar. 1, 1985 (U.S. Pat. No. 4,680,000) and having a common assignee with the present application, an apparatus is provided wherein labels are successively removed from a label magazine and positioned in an array which corresponds in spacing to the spacing of the sets of molds. The labels are then simultaneously moved in the array from the first position to a second position within the open partible molds and deposited in the molds. The apparatus comprises a magazine for supporting labels in a stack and an endless belt transfer device positioned adjacent the magazine. The belt is indexed in predetermined spaces corresponding to the spaces of the array of molds. A label pick-up device removes a label from the magazine and deposits it on the conveyor so that the spacing between the labels on the endless transfer conveyor corresponds to the spacing between the sets of molds. Another label deposit device removes the labels simultaneously from the endless transfer conveyor and delivers them between the open partible molds.

Where labels are to be cut from a roll of labels, problems arise because the free end of labels tends to move so that when a label is cut from the roll, the cut may not be square. These conditions are aggravated when the labels are made of plastic.

Accordingly, among the objectives of the present invention are to provide a method and apparatus for accurately severing a label from a roll of labels and delivering the label to a partible mold; a method and apparatus will deliver labels successively in an array to a plurality of partible molds; and which can readily be adjusted to sever and deliver labels of different sizes.

In accordance with the invention, the method and apparatus which comprises providing labels on a roll of labels, successively engaging the free end of the web of the roll of labels by a first endless vacuum conveyor, tensioning the portion of the web between a point upstream and the free end by the first endless vacuum conveyor, successively cutting a label on the free end from the remaining tensioned portion, transferring each label successively by moving the first endless conveyor adjacent a second endless vacuum conveyor which is transverse to the first conveyor, indexing the second endless conveyor to provide an array of labels on the second endless conveyor which corresponds in spacing to the spacing of the array of molds, engaging the array of labels and moving them from a first position adjacent said second conveyor to a second position within the partible molds and depositing the labels in the molds.

DESCRIPTION

Figure 1:
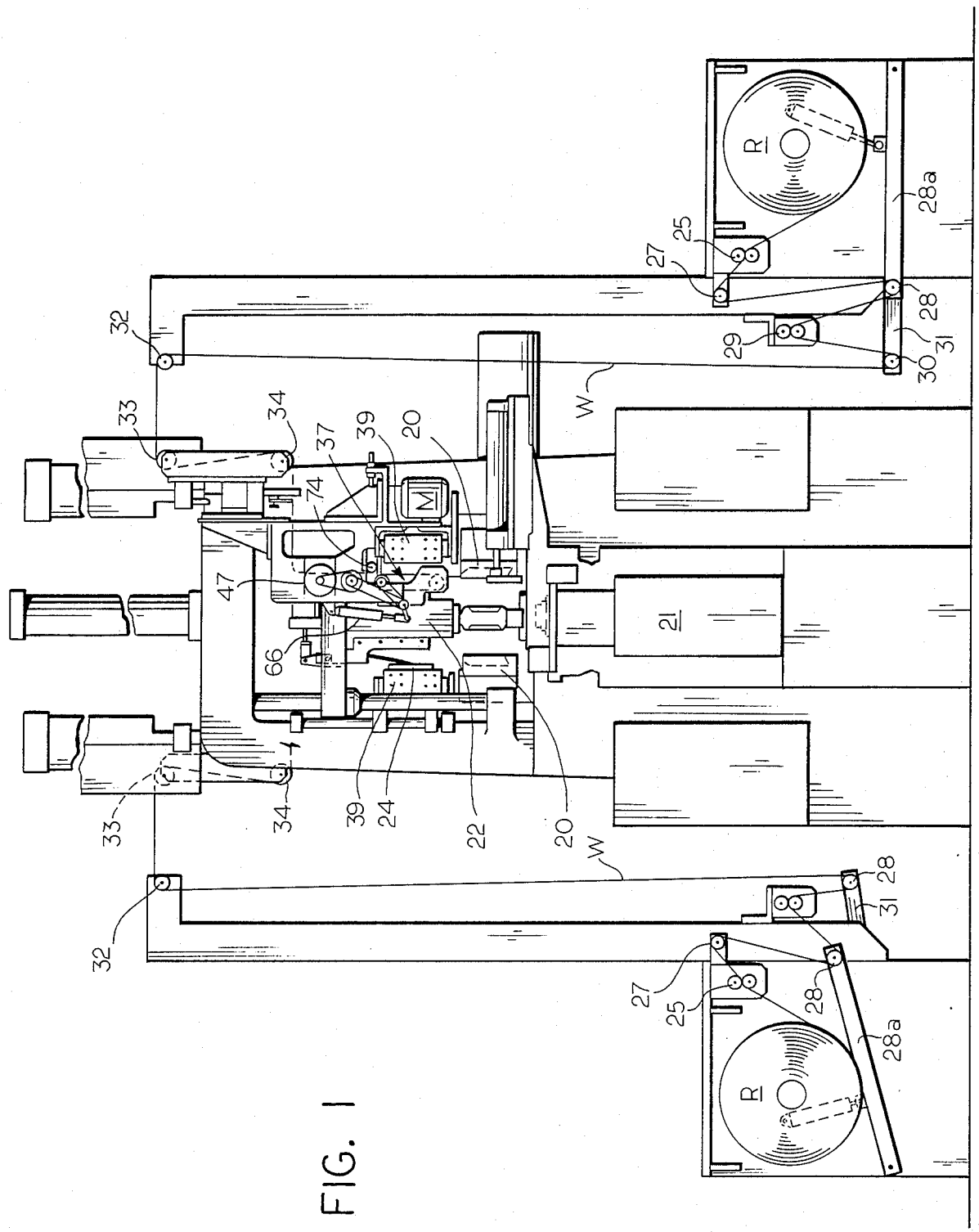
FIG. 1 is a side elevational view of a blow molding apparatus embodying the invention.
Figure 2:
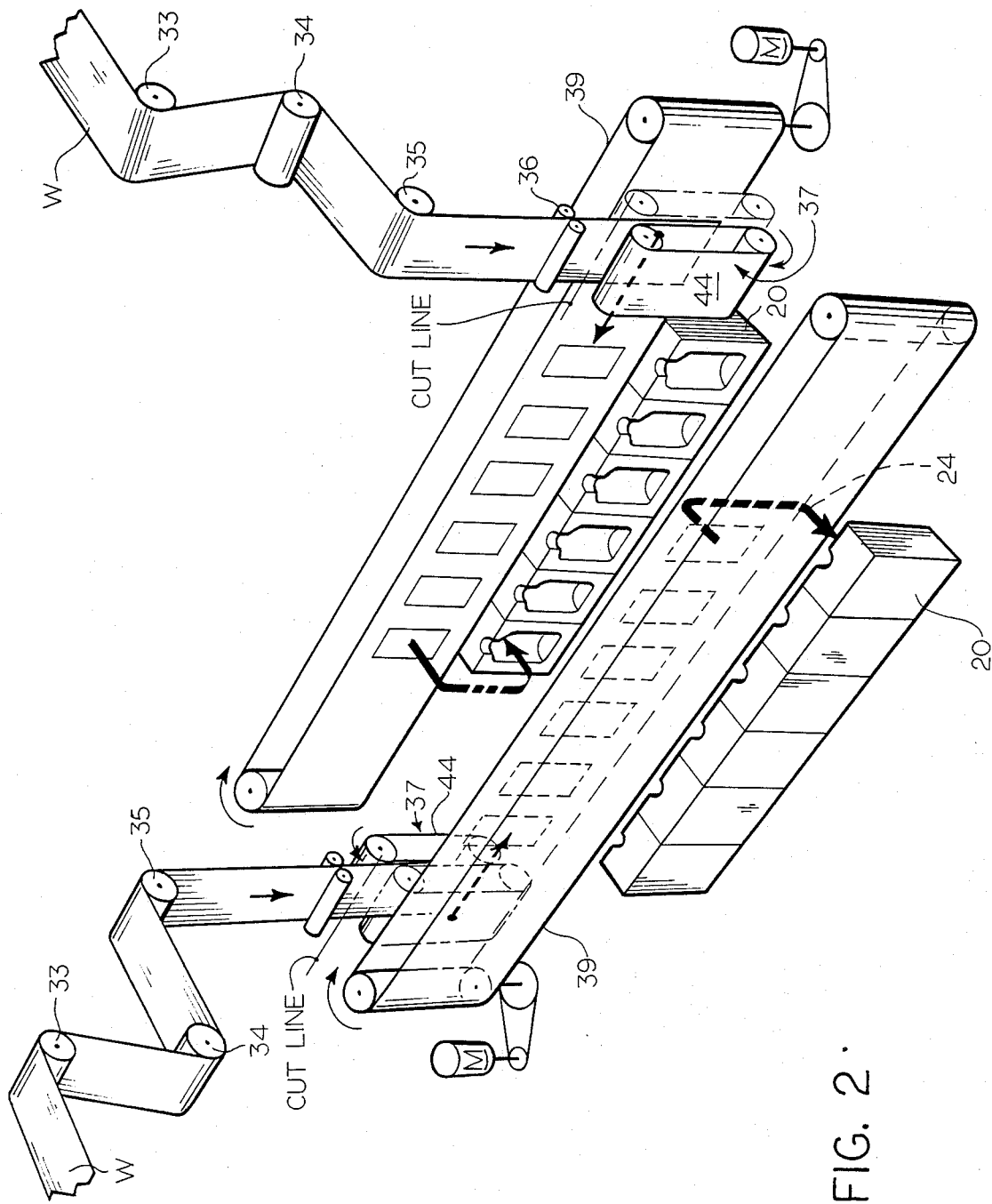
FIG. 2 is a fragmentary perspective schematic view embodying the apparatus.

Referring to FIGS. 1 and 2, the invention relates to blow molded plastic articles such as containers wherein labels are applied to sections of a set of molds and the mold sections are closed and heated parisons or preforms are blown outwardly into conformity with the mold sections causing the labels to be adhered or bonded to the blown articles.

In one type of apparatus to which the invention relates, the apparatus includes a plurality of sets of partible molds 20 in a linear array, that is, in side-by-side relationship. An extruder 21 is associated with each set of molds and a head 22 is moved downwardly to receive the end of an extruded tube in a neck mold in the head which is then drawn upwardly to position a preform or parison between the mold sections 20. The mold sections are then closed and the article blown to the desired configuration within the confines of the mold. Where a label is to be applied, the head 22 supports label deposit devices 24 as hereinafter described which deliver labels to the mold sections. If only one label is to be applied, a single deposit device 24 is provided for each set of molds.

In accordance with the invention, labels are provided on the webs W of a roll R of label material such as plastic or paper on each side of the machine. The end of each web W is trained between a first set of driven pinch rollers 25 over an idler roller 27 and then under a roller 28 on a first pneumatically operated dancer arm 28a, and then between a second set of driven pinch rollers 29 and then under an idler roller 30 on a dancer arm 31.

Figure 3:
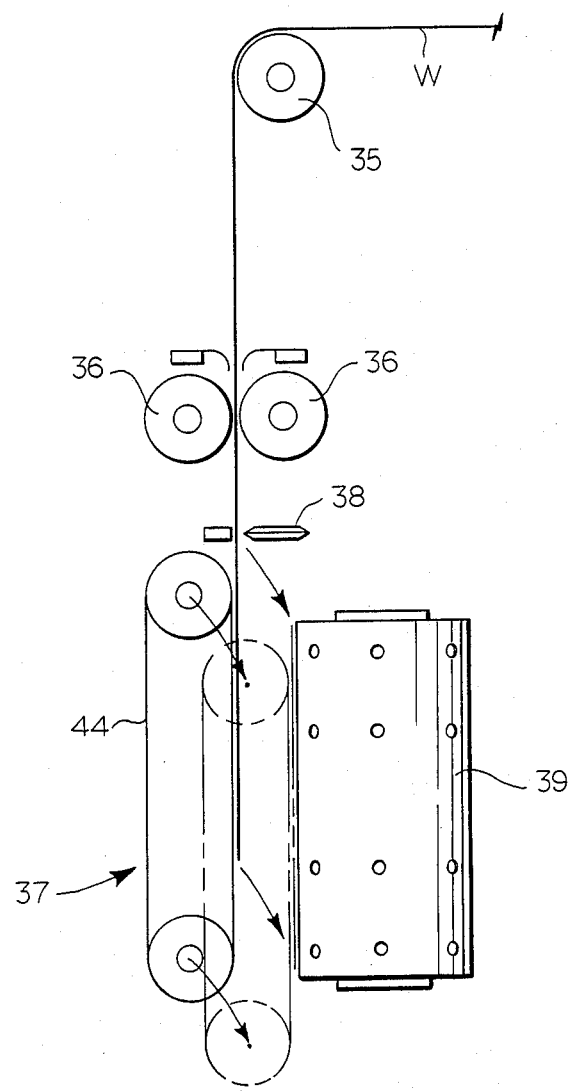
FIG. 3 is a fragmentary elevational schematic of a portion of the apparatus.

Referring to FIGS. 2 and 3, the web W passes from idler roller 30 upwardly over an idler roller 32 and horizontally over an idler roller 33, vertically to an idler roller 34 and then horizontally to an idler roller 35 and then downwardly between driven pinch rollers 36, on each side of the machine. The free end of the web W is then engaged by an endless vacuum conveyor 37, the belt of which moves to apply tension on the portion of the web between the driven rollers 36 and the conveyor 37. A knife assembly 38 is then actuated to sever the label from the portion under tension. The endless conveyor 37 then continues to operate until the label is centered on the endless conveyor 37. Thereafter, the endless conveyor 37 is moved bodily to bring the label adjacent an endless vacuum transfer conveyor 39 that extends horizontally. Endless transfer conveyor 38 is indexed horizontally relative to its respective conveyor 37. Successive labels are similarly severed and delivered to the conveyor 39 to provide an array of labels on the conveyor 39 corresponding to the number of cavities defined by mold sections 20 of the blow molding machine. Thereafter, the label deposit devices 40 function to remove the labels from the conveyor 39 and deposit them in the respective cavities of the mold sections 20. The endless conveyor 37 is driven intermittently by a motor M such as a stepping motor. Alternatively, the endless conveyor may be constructed and arranged in the manner set forth in the aforementioned application Ser. No. 707,335 (U.S. Pat. No. 4,680,000), which is incorporated herein by reference.

Figure 4:
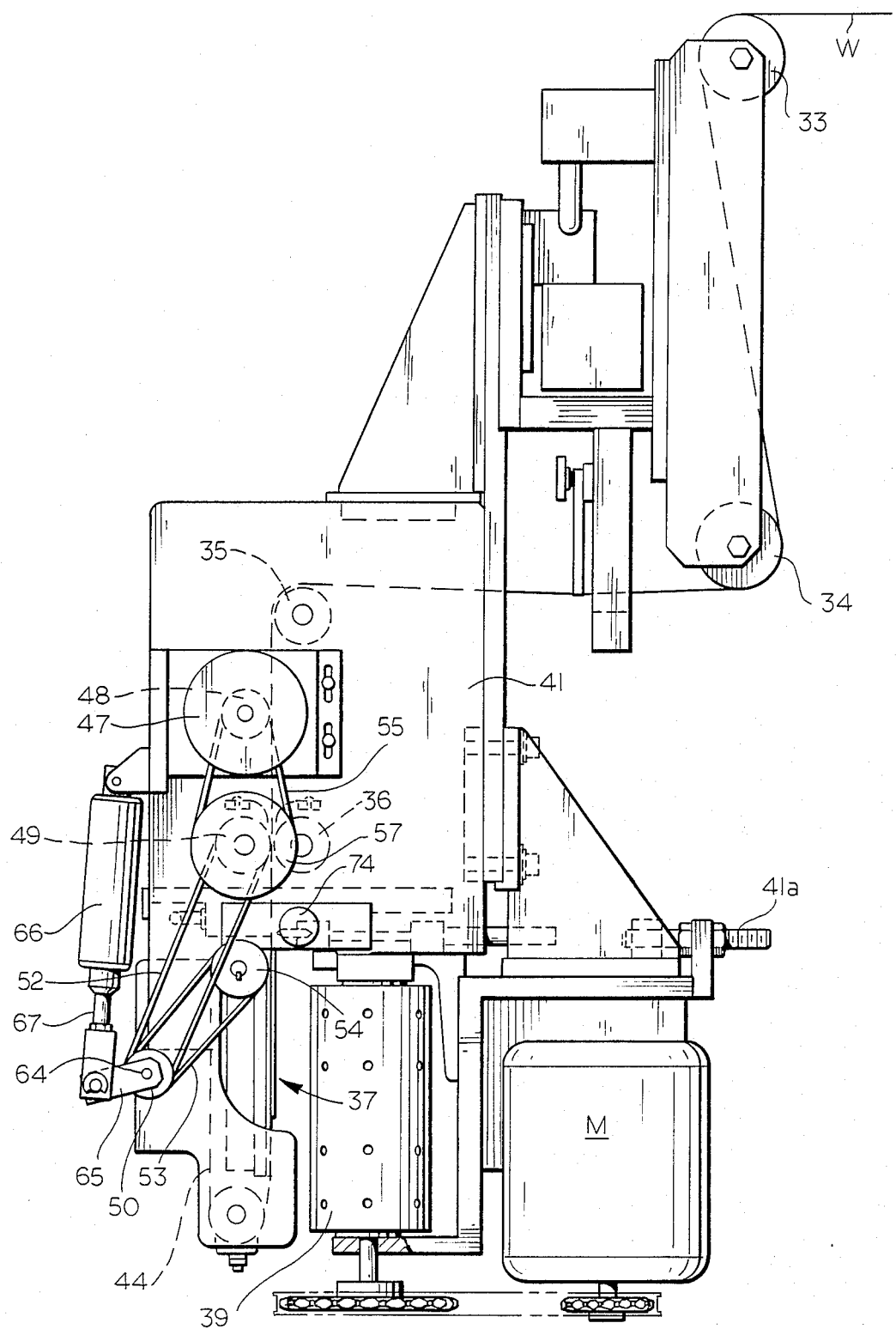
FIG. 4 is a fragmentary elevational view on an enlarged scale of a portion of the apparatus shown in FIG. 1.
Figure 5:
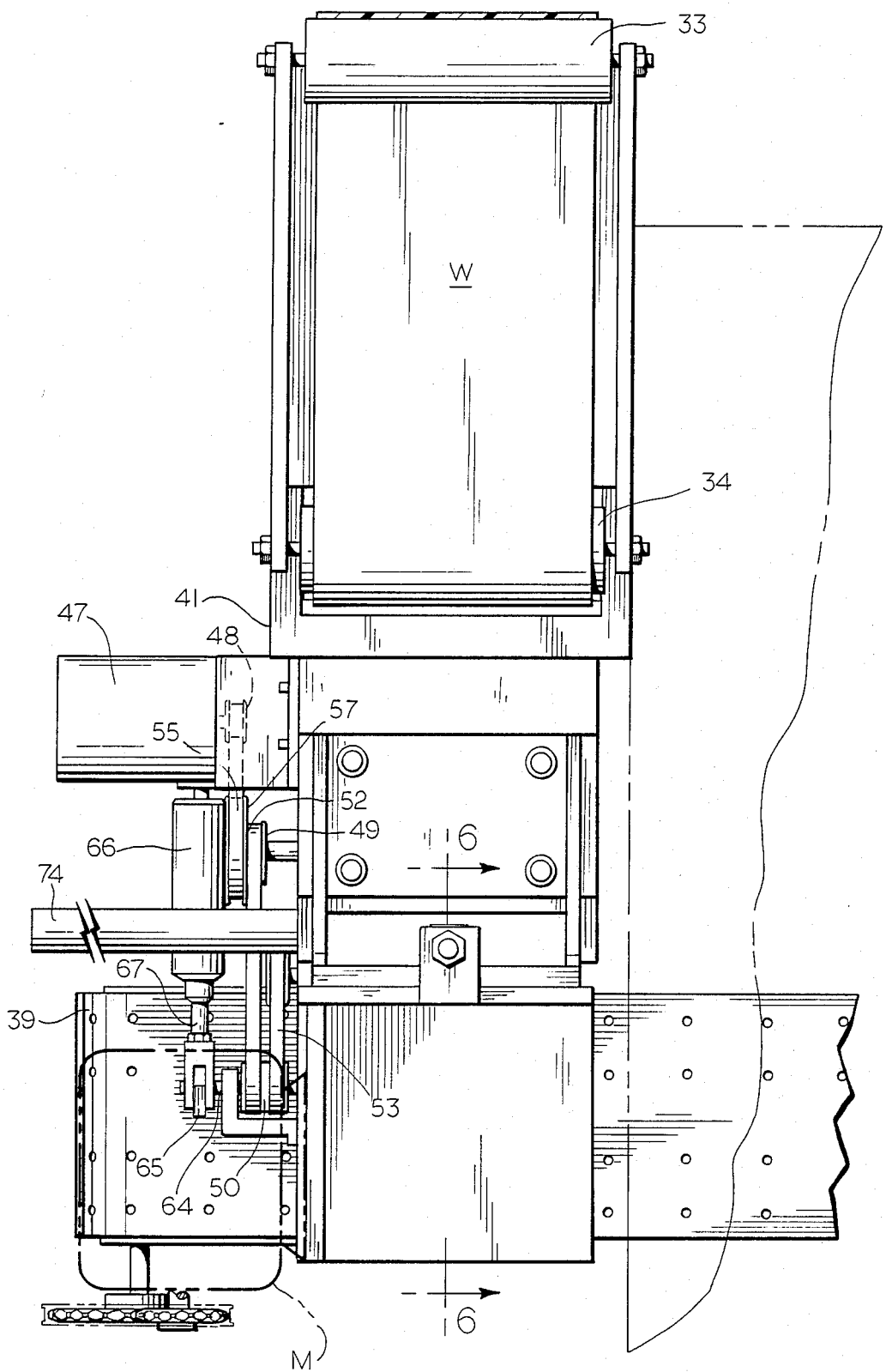
FIG. 5 is a fragmentary side elevational view taken from the right side in FIG. 4.
Figure 8:
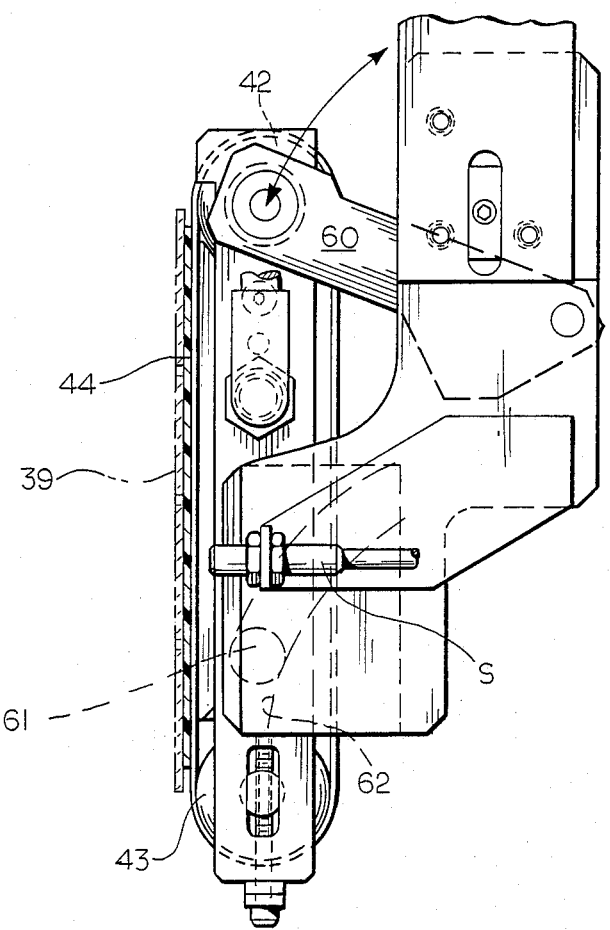
FIG. 8 is a fragmentary rear elevational view of a portion of the apparatus shown in FIG. 10.
Figure 9:
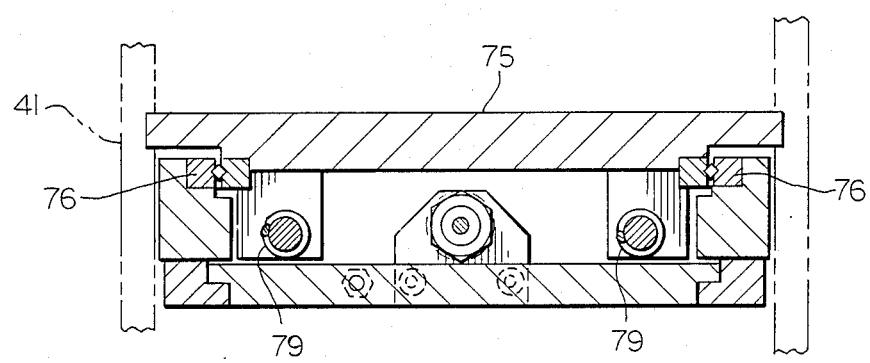
FIG. 9 is a sectional view taken along the line 9—9 in FIG. 7.
Figure 11:
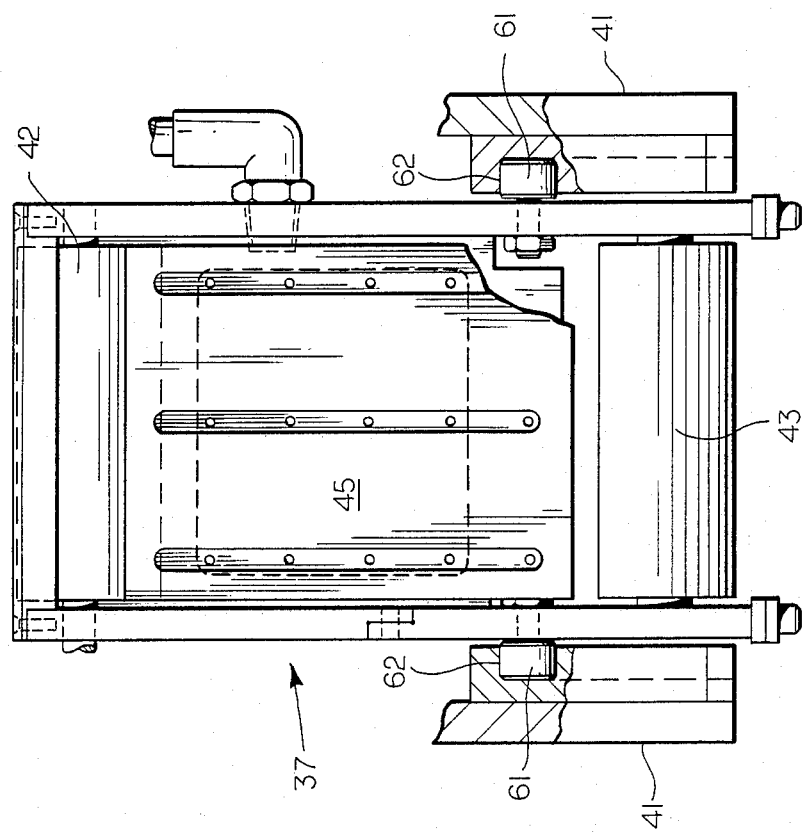
FIG. 11 is a part sectional side elevational view taken from the right in FIG. 10, parts being broken away.
Figure 10:
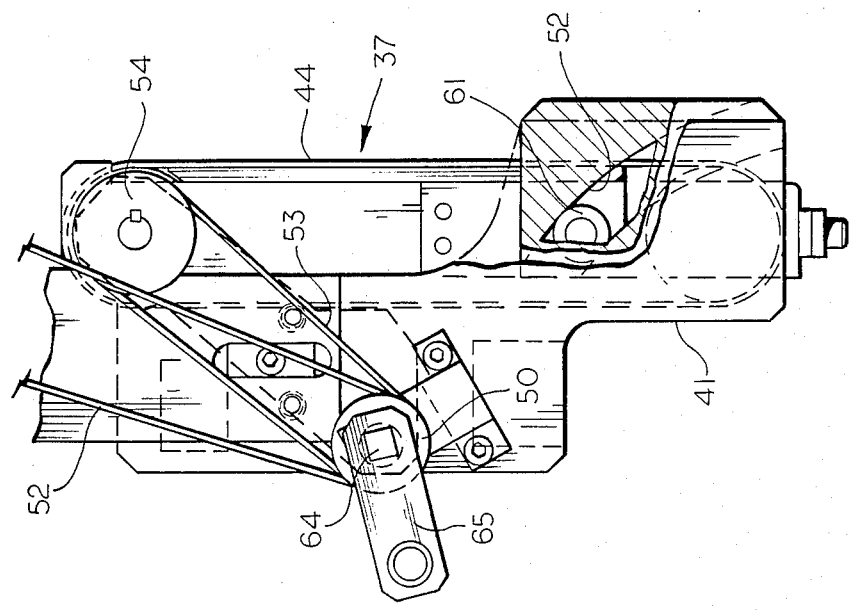
FIG. 10 is a fragmentary part sectional side elevational view taken from the left in FIG. 5.
Figure 12:
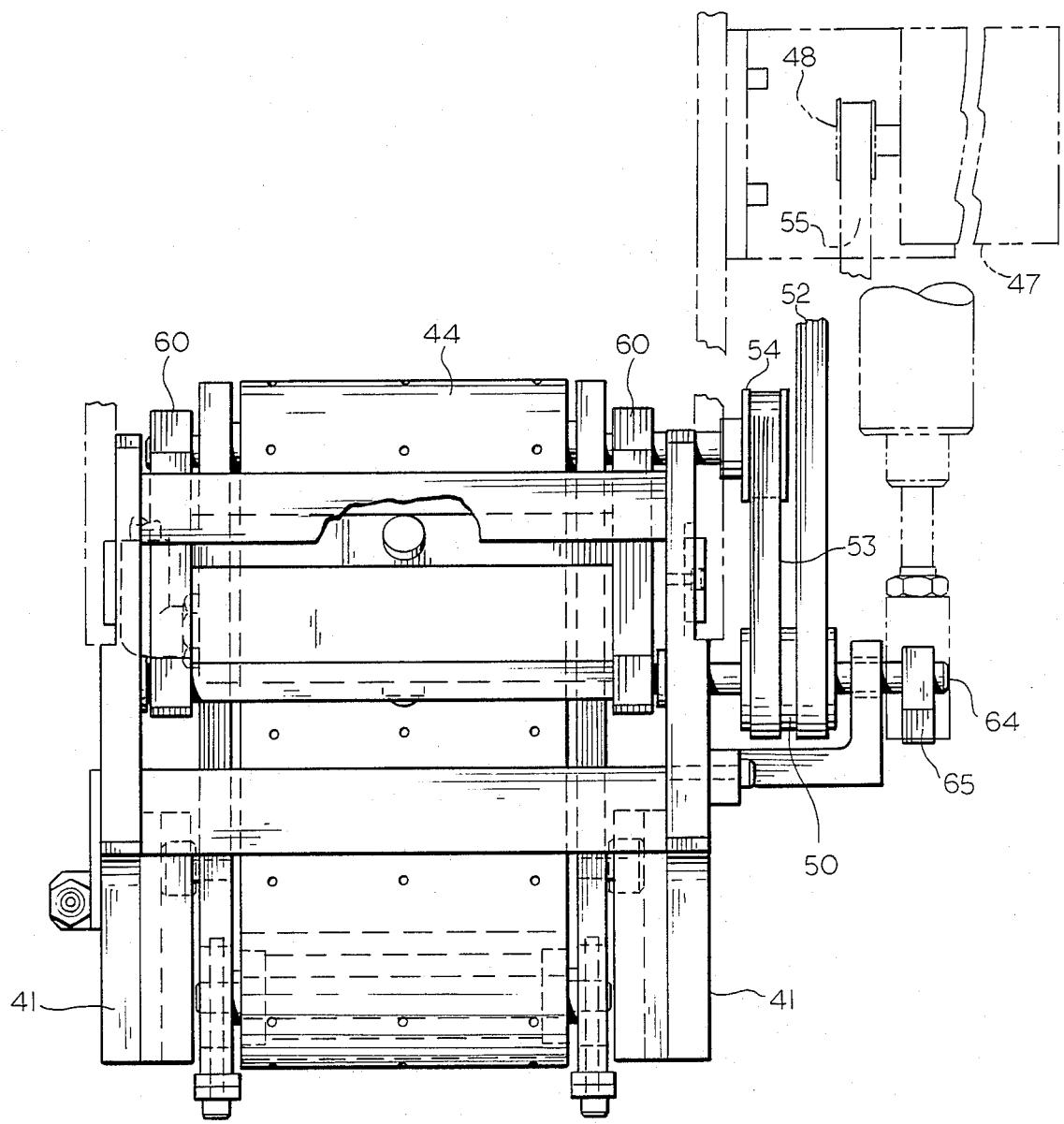
FIG. 12 is a fragmentary rear elevational view of the apparatus shown in FIG. 5.

Referring to FIGS. 4–12, the first endless vacuum conveyor 37 comprises a frame 41 that supports vertically spaced rollers 42, 43 over which a perforated belt 44 is trained. The frame 41 supports a vacuum manifold 45 having openings 46 adjacent the belt 44 for applying vacuum to the belt 44. The belt 44 is driven intermittently by a motor 47 which, in turn, drives a pulley 48 and, in turn, pulleys 49, 50 through endless belts 52, 53 to drive pulley 49 mounted on the shaft of upper roller 42. The motor M also functions to drive one of the pinch rollers 36 through a second endless belt 55 trained over the pulley 50 and another pulley 57 on the shaft of the one pinch roller 36. (FIGS. 4, 10, 12)

The frame 41 of the first endless vacuum conveyor is mounted on a fixed portion of the machine for movement horizontally and downwardly toward the second endless vacuum conveyor 39 and upwardly and outwardly away from the endless vacuum conveyor 39. Specifically, this is achieved by a pair of levers 60 which are pivoted at one end to a fixed portion of the machine and at the other end to the shaft of the upper roller 42 (FIG. 8). The lower end of the frame 41 supports rollers 61 that engage arcuate cam tracks 62 in the main frame which guide the lower end of the frame 41 and, in turn, the first vacuum conveyor 37 such that when the levers 60 are swung, the upper end of conveyor 37 is moved through an arc and the lower end of the conveyor moves in parallel fashion to the arc of movement of the upper end. In order to move the conveyor 37 between its two positions, a link 65 is provided on the shaft 64 of the pulleys 50, 56. A pneumatic cylinder 66 has its piston rod 67 connected to the link 65 such that operation of the pneumatic cylinder 66 will cause the first conveyor to move between the first position shown in solid lines in FIG. 3 and a second position shown in broken lines in FIG. 3.

A fixed stop 68 for frame 41 is provided on the main frame to determine the first portion of conveyor 37. A second adjustable stop 69 in the form of a screw on the main frame permits adjustment of the second position of the conveyor 37.

Figure 6:
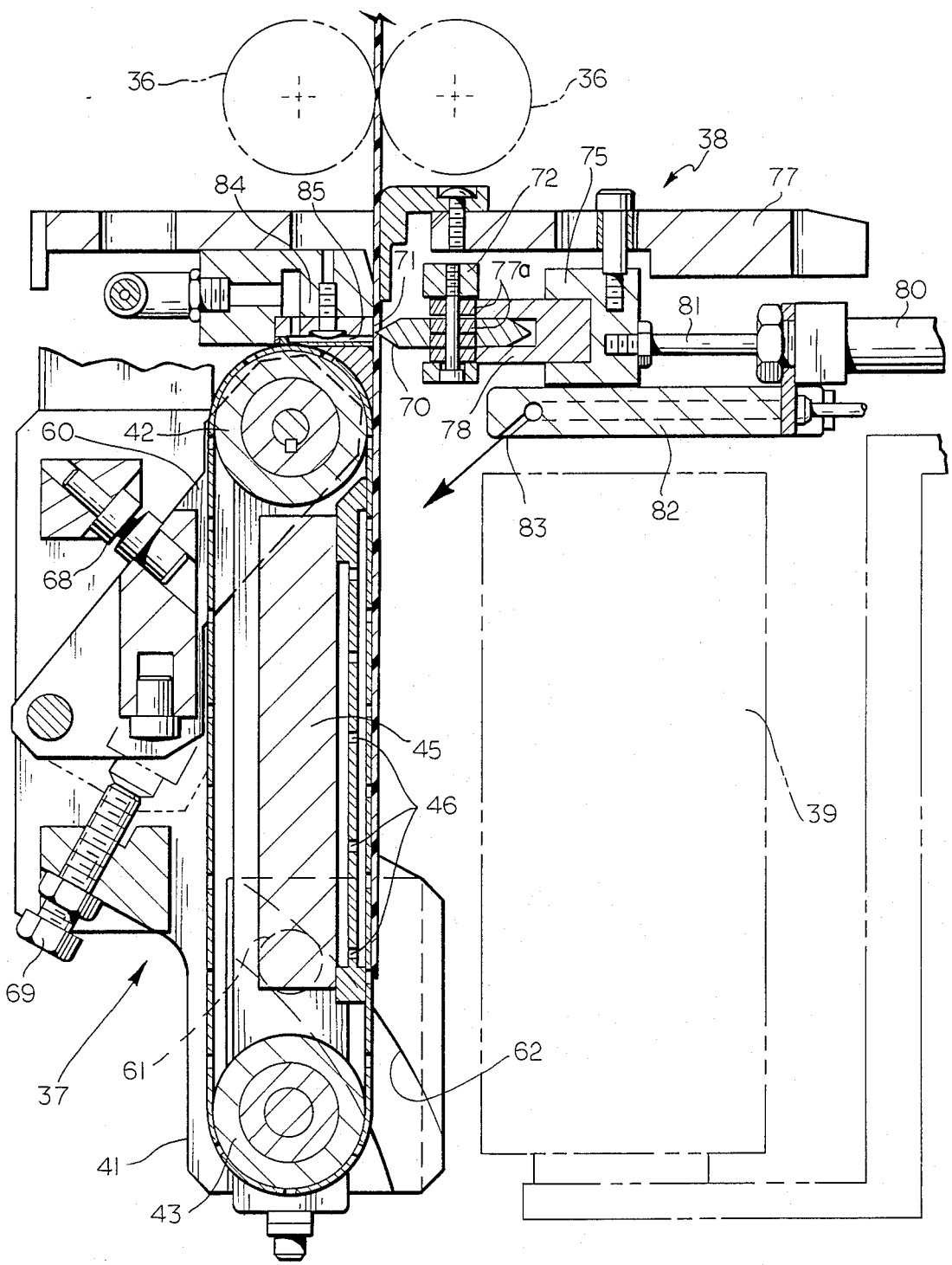
FIG. 6 is a fragmentary sectional view on an enlarged scale taken along the line 6—6 in FIG. 5.
Figure 7:
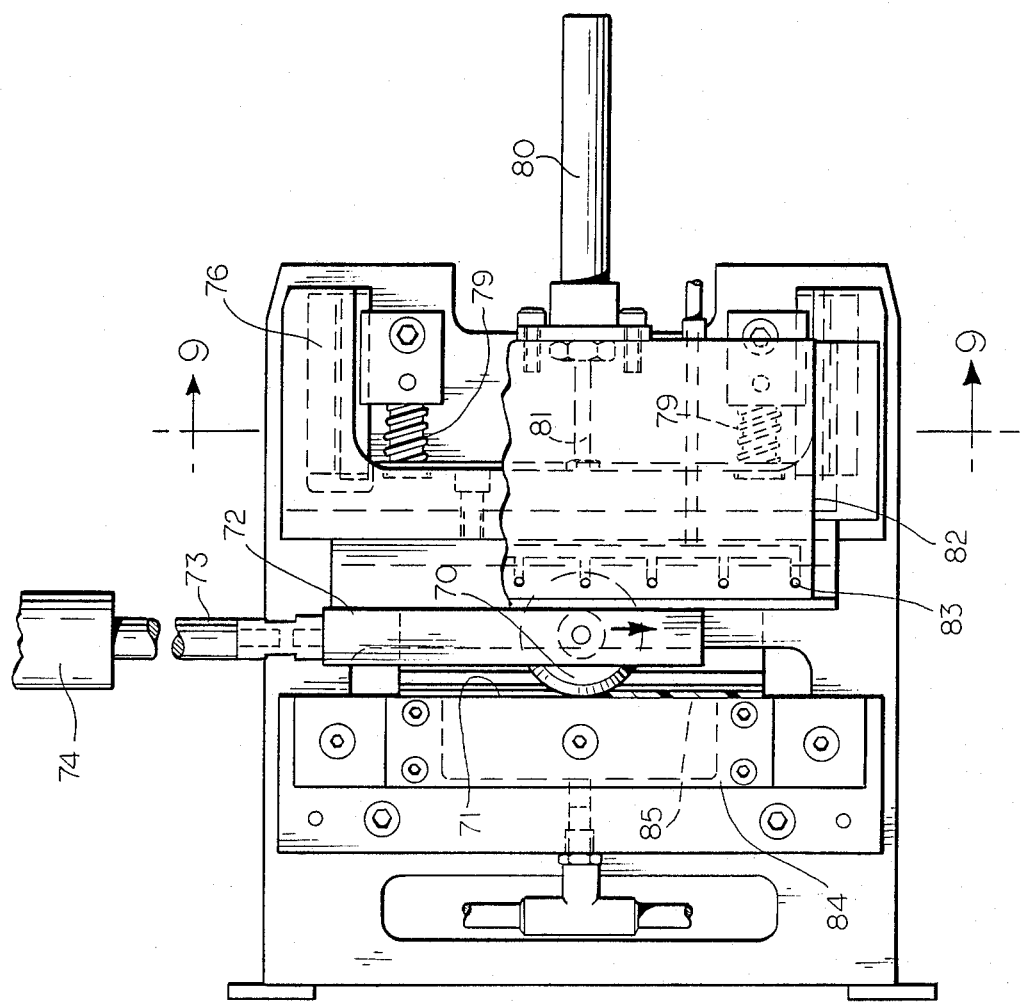
FIG. 7 is a fragmentary bottom plan view of the apparatus shown in FIG. 6, parts being broken away.

Referring to FIGS. 6, 7 and 9, knife assembly 38 comprises a roller 70 which acts against an anvil 71 so that when the roller 70 is moved horizontally against a web on the anvil 71, a label is cut from the web. Roller 70 is rotatably mounted between the arms of a yoke 72 that is movable along anvil 71 by a link 73 which is operated by a linear motor 74. A slide 75 is supported on slide track 76 on frame 77 and supports a U-shaped bracket 78, the arms of which engage rollers 77a on the shaft 78 of roller 70. Springs 79 urge the slide 75 and, in turn, roller 70 against the anvil 71. A pneumatic cylinder 80 has its shaft 81 connected to slide 75 to position the slide 75 relative to the anvil 71.

A first air chamber 82 is mounted on frame 76 and has downwardly and inwardly inclined openings 83 for directing air against the upper edge of the label which is being cut. A second air chamber 84 is mounted on the frame of the machine and has openings 85 for directing air against the other side of the web so that when a label is severed from the web, the label will not adhere to the anvil 71.

Figure 13:
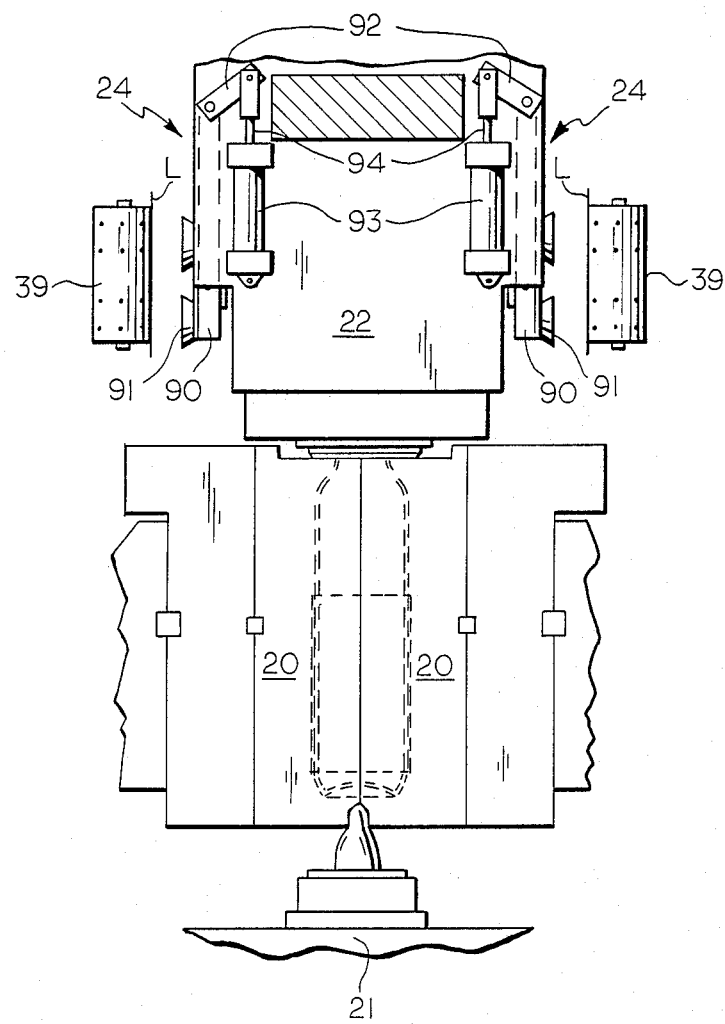
FIG. 13 is a fragmentary part sectional elevational view on an enlarged scale of another portion of the apparatus shown in FIG. 1.

Referring to FIGS. 13 the label deposit devices 24 on each side of the head 22 can be of various types, preferably vacuum pick-up and delivery devices, which function to pick up each label from the endless conveyor 37 and deliver it to the cavity of the mold.

Each device includes a bar 90 that supports vacuum pads 91 and is supported by links 92 pivoted to the head 22 and actuated by a cylinder 93 which has its shaft 94 connected by a link 92 to move the vacuum cups toward conveyor 38 to pick up an array of labels and is retracted away from the conveyor 37 while the head moves adjacent the mold sections. When the head moves between the mold sections, the bars are moved outwardly to deposit the array of labels into the mold sections 20. The pads 81 are extended to deposit the array of labels to the mold cavities.

In operation, the drive rollers are operated intermittently to bring the free edge of the web W in position for cutting a label from the web W. As the free edge of a label to be cut is moved adjacent the first endless conveyor 37, the first endless conveyor 37 is energized to cause the belt 44 to apply tension on the portion of the web between pinch roller 36 and the belt 44. The knife assembly is then actuated to cut off the label. The endless conveyor 37 continues to operate until the label is positioned centrally of a reach of belt 44 between rollers 42, 43. The cylinder 66 is then actuated to swing conveyor 37 bodily to a position adjacent conveyor 39 to transfer the label by interrupting or lowering the vacuum to belt 44. The conveyor 39 is then indexed and conveyor 37 is returned to its first position adjacent the pinch rollers 36 for a new cycle of severing another label and delivering it to the conveyor 39. Successive labels are cut and delivered to the conveyor 37 until an array of labels are provided on conveyor 39. The label deposit devices 24 are then actuated to simultaneously engage and remove the array of labels from conveyor 39 so that they can be delivered simultaneously to the array of partible molds when head 22 moves downwardly.

The movement of conveyor 27 can be adjusted to accommodate different size labels by moving the frame 41 relative to the main frame by adjusting screw 41a (FIG. 4).

It can thus be seen that there has been provide a method and apparatus for accurately severing a label from a roll of labels and delivering the label to a partible mold; a method and apparatus will deliver labels successively in an array to a plurality of partible molds; and which can readily be adjusted to sever and deliver labels of different sizes.

We claim:

1. In a method of making hollow plastic articles wherein a label is positioned in each of a plurality of sets of spaced partible molds, a preform is positioned in each set of partible molds and the molds are closed and the preform is blown outwardly to the confines of the mold to apply the label to the resultant hollow plastic article, the method of positioning the labels in the molds which comprises:

providing labels on a roll of labels in a web having a free end, successively engaging the free end of the web of the roll of labels by a first endless vacuum conveyor and tensioning a portion of the web between a point upstream of the free end and the free end by said first endless vacuum conveyor by operating the endless vacuum conveyor to tension the portion of the web, successively cutting labels from successive tensioned portions while the free end is engaged by said first endless vacuum conveyor, transferring each label successively adjacent a second endless vacuum conveyor by moving the first endless vacuum conveyor bodily to a position adjacent said second endless vacuum conveyor, indexing the second conveyor successively to provide an array of labels which corresponds in spacing to the spacing of the sets of molds, simultaneously engaging the array of labels and moving the array of labels from a first position on said second conveyor to a second position within the partible molds; and, simultaneously depositing the array of labels in the molds.

2. The method set forth in claim 1 wherein said step of tensioning a portion of said web is achieved by pinching the web at said point upstream.

3. The method set forth in claim 1 wherein said step of cutting is achieved by moving the web between a roller and an anvil and moving the roller transversely of the web.

4. In a method of making hollow plastic articles wherein a label is positioned in each of a plurality of sets of spaced partible molds and the molds are closed and the preform is blown outwardly to the confines of the mold to apply the label to the resultant hollow plastic article, the method of positioning the labels in the molds which comprises:

providing labels on a roll of labels in a web having a free end, successively engaging the free end of the web of the roll of labels by a first endless vacuum conveyor and tensioning a portion of the web between a point upstream of the free end and the free end by said first endless vacuum conveyor by operating the endless vacuum conveyor to tension the portion of the web, successively cutting labels from successive tensioned portions while the fee end is engaged by said first endless vacuum conveyor, indexing the second conveyor successively to receive the labels successively from the first endless vacuum conveyor to provide an array of labels which corresponds in spacing to the spacing of the sets of molds, simultaneously engaging the array of labels and moving the array of labels from a first position on said second vacuum conveyor to a second position within the partible molds; and, simultaneously depositing the array of labels in the molds.

5. The method set forth in claim 4 wherein said step of tensioning a portion of said web is achieved by placing the web at said point upstream.

6. The method set forth in claim 4 wherein said step of cutting is achieved by moving the web between a roller and an anvil and moving the roller transversely of the web.

7. In a method of making hollow plastic articles wherein a label is positioned in each of a plurality of sets of spaced partible molds, a preform is positioned in each set of partible molds and the molds are closed and the preform is blow outwardly to the confines of the mold to apply the label to the resultant hollow plastic article, the method of positioning the labels in the molds which comprises:

providing labels on a roll of labels in a web having a free end, successively engaging the free end of the web of the roll of labels by a first endless vacuum conveyor and tensioning a portion of the web between a point upstream of the free end and the free end by said first endless vacuum conveyor by operating the endless vacuum conveyor to tension the portion of the web, successively cutting labels from successive tensioned portions while the free end is engaged by said first endless vacuum conveyor, transferring each label successively by moving the first endless vacuum conveyor with a label thereon adjacent a second a second endless vacuum conveyor, said step of moving said first endless conveyor being achieved by swinging the first endless conveyor bodily between a first position adjacent the web and a second position adjacent the second conveyor, indexing the second conveyor successively to receive the labels successively and by movement of the first endless vacuum conveyor to provide an array of labels which corresponds in spacing to the spacing of the sets of molds, simultaneously engaging the array of labels and moving the array of labels from a first position on said second conveyor to a second position within the partible molds; and, simultaneously depositing the array of labels in the molds.

* * * * *